May 22, 1928.  
H. M. DENYES  
CONTROL ASSEMBLY  
Filed March 16, 1922
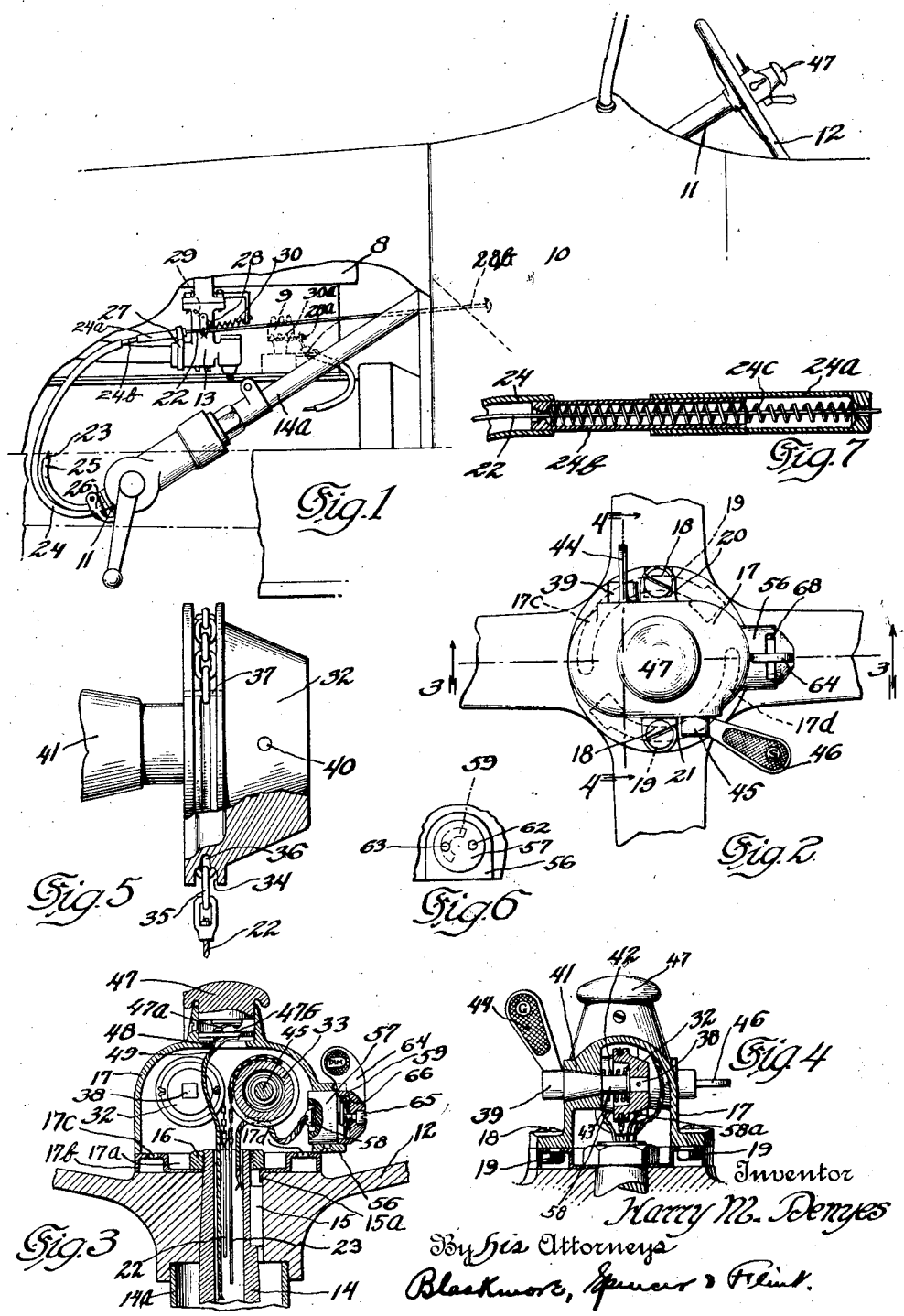

Patented May 22, 1928.

1,670,847

UNITED STATES PATENT OFFICE.

HARRY M. DENYES, OF SAGINAW, MICHIGAN, ASSIGNOR TO GENERAL MOTORS CORPORATION, OF DETROIT, MICHIGAN, A CORPORATION OF DELAWARE.

CONTROL ASSEMBLY.

Application filed March 16, 1922. Serial No. 544,367.

This invention relates to automobiles and more particularly to control assembly therefor.

One of the objects of the invention is the provision of new and improved devices for operating the control mechanisms which may be conveniently mounted on the steering wheel of an automobile.

Another object of the invention is the provision of means for operating a plurality of electric switches together with new and improved means for mounting the same on the steering wheel within easy reach of the operator.

A still further object of the invention is the provision of new and improved control operating devices including flexible elements whereby the usual control operating links and levers may be dispensed with and flexible members extended about the engine to the desired position for attachment directly to the control mechanisms.

Other and further objects and advantages of the invention will appear as the description proceeds.

On the drawing Fig. 1 is a side elevation of a portion of a car showing my invention in position thereon, with parts broken away.

Fig. 2 is a plan view of a portion of the steering wheel.

Fig. 3 is a section on line 3—3 of Fig. 2.

Fig. 4 is a section on line 4—4 of Fig. 2;

Fig. 5 is a detail showing one of the operating drums somewhat enlarged; and Figs. 6 and 7 are detail views of portions of the device.

It has been customary in automobile construction to mount the lever controls for the gas and spark and the switch for the horn all on the steering wheel in position to be conveniently operated by the driver of the car. It is also old in the art to mount the dimmer switch on the steering column or on the instrument board but such an arrangement is more or less inconvenient for the operator. In order to overcome this difficulty and at the same time group these control operating devices together provision is made for mounting them all on the steering wheel in a convenient position for the operator.

On the drawing the numeral 10 indicates an automobile provided with a steering column 11, steering wheel 12 at the upper end thereof and an engine 8 having a distributer 9 and carburetor 13 therefor, all of the usual or well known construction. The steering column 11 consists of the usual tubular steering post 14 (see Fig. 3) to the upper end of which is rigidly secured the steering wheel 12 in any suitable manner as by means of a key 15 engaging registering slots in said post and wheel. The wheel is held in position on the steering post by means of an annular nut 16. In most constructions the steering post 14 is surrounded by a tubular steering column 14$^a$ which is secured to the dashboard of the automobile. This column is employed for the purpose, among other things, of housing the connections to the control operating mechanisms. In the present construction, the use of a housing for this purpose is not necessary and may, if desired, be dispensed with because these members are located in, and protected by, the steering post itself, as will presently appear.

A casing or housing 17 of bakelite or any other suitable material is adapted to be detachably secured to the hub of the wheel on the upper side thereof in any suitable manner. It is necessary for the convenience of the operator that the operating levers carried by the casing or housing be properly adjusted relatively to the steering wheel, and since the steering wheel is not always properly positioned relatively to the steering mechanism, the casing or housing 17 is preferably provided with means for adjustably securing the same to the steering post or wheel, whereby the said casing or housing may be properly angularly adjusted relatively thereto. Any suitable means may be provided for this purpose. As shown, a base member 17$^a$ is employed to which the casing or housing 17 is adjustably connected. The base member may be stamped from sheet metal in such a manner as to form an abutment 17$^b$ about the peripheral edge thereof. This abutment is in the form of an inverted U in cross-section and is adapted to support the casing or housing 17. The central or depressed portion of the base member is provided with an opening for engaging the upper end of the steering post 14. It is clamped in position against the hub of the wheel by means of the nut 16. A projection 15ª on the base member 17ª engages in the key way and prevents the former from turning.

The abutment 17ᵇ is provided in its top wall with two oppositely arranged arcuate slots 17ᶜ and 17ᵈ in which the bolts 18 for adjustably securing the casing or housing 17 on the base member 17ª, are adapted to engage. Nuts 19, located within the chamber formed by the abutment 17ᵇ and the hub of the steering wheel, are adapted to engage the bolts 18 for securing the casing or housing in any position to which the same may be adjusted. Each slot has an enlarged end through which the corresponding nut, 19, may be inserted.

Mounted in the casing are suitable devices for operating flexible members that control the spark and throttle. Suitable switch mechanisms for the horn and dimmer lights are also mounted on this casing.

The flexible connector members 22 and 23 are so arranged that they extend downwardly through the hollow steering post 14 and from the lower end of said post are led to the levers for operating the throttle and spark. These flexible connector members may be of any suitable construction but preferably they are formed of a plurality of metallic wires woven or twisted together in any suitable manner. Single wires or flexible members of any other suitable material may be employed.

Guide members are provided for directing the flexible connector members about the engine. Any suitable means may be provided for this purpose, such as a plurality of guiding eyes, tubes or flexible conduits. As shown on the drawings, conduits 24 and 25 are provided for conducting the connector members to the desired position. These conduits are flexible enough to be bent to the desired shape and yet are sufficiently rigid to maintain that shape when once bent, whereby a minimum amount of friction will be created between the same and the flexible connector members during the control adjustments. These conduits have their inner ends secured, by the clamping bracket 26, adjacent to the lower end of the steering post in such a position as to receive the connector members 22 and 23 which extend therethrough. The outer ends of the conduits 24 and 25 are secured by clamping brackets, one of which is shown at 27, adjacent to the levers for operating the control mechanisms.

The flexible connector members 22 and 23 extend through the conduits 24 and 25 respectively and have their outer ends connected to the levers for operating the control mechanisms. The flexible connector member 22 has its outer end detachably connected to the bell crank arm or lever 28 in any suitable manner for operating the throttle valve 29 in one direction and a spring 30 is provided for operating the throttle valve in the opposite direction.

On motor vehicles employing an accelerator it is necessary to provide a compensating device for permitting the opening of the throttle without operating the hand lever 44. Any suitable means may be provided for this purpose. As shown in Figs. 1 and 7 the outer end of the conduit or guide 24 may be provided with a telescopic tube comprising the sections 24ª and 24ᵇ. The outer section 24ª is attached at its forward end to the bracket 27 and is provided with an internal annular shoulder having a restricted opening through which the member 22 is adapted to extend. The rear end of the inner tube 24ᵇ is secured in any suitable manner to the outer end of the conduit 24 and is likewise provided with an internal annular shoulder and with a restricted opening through which the flexible member 22 also extends. A long light spring 24ᶜ engaging the internal shoulders of the sections 24ª and 24ᵇ of the telescopic tubes, is adapted to extend the telescopic tube to compensate for the movement of the throttle lever when it is operated by the accelerator mechanism. When the accelerator mechanism is released the spring 30 which is strong enough to overcome the resistance of the light spring 24ᶜ, will move the throttle toward closing position.

The spring 30 may be so arranged as to either open or close the throttle, as desired. As shown, however, it operates to close it. In practice, the flexible connector member is usually sufficiently rigid to operate the throttle in both directions but a spring is preferably employed to assist in the closing movement of the throttle and to ensure complete closing of the same. Moreover, the spring 30 is necessary to move the throttle toward closing position when an accelerator is employed.

Since the details of the accelerator mechanism form no part of this invention, it is not thought necessary to show and describe those details. A simple form of this mechanism is shown more or less diagrammatically in Fig. 1. An accelerator member 28ᵇ is adapted to have its forward end secured in any suitable manner to the throttle lever 28 and extends rearwardly into the forward portion of the car body to a position to be conveniently operated by the foot of the operator. The guide 25 shown broken away in Fig. 1, is adapted to be carried to the other side of the engine adjacent to another control mechanism, as the spark or distributer lever 28ª shown in dotted lines in Fig. 1 to which the flexible connector member 23 is detachably secured for operating the same in a manner similar to the bell crank arm 28. A spring 30$^a$ is adapted to move the lever 28$^a$ in the opposite direction.

It will thus be seen that the levers for controlling the throttle and the spark may be operated in one direction by pulling upwardly on the upper ends of the flexible connector members 22 and 23 and that by releasing said members the levers are moved in the opposite direction by means of springs. Any suitable mechanism may be provided for drawing upwardly on the flexible connector members 22 and 23. As shown on the drawing, this is accomplished by the provision of drums 32 and 33 about which the flexible connector members 22 and 23 may be wound.

Since the two drums and the mechanism for operating them are similar in construction only the drum 32 and the mechanism for operating the same need be described. As shown in Figs. 4 and 5 the drum 32 is provided with a groove 34 for the reception of a flexible operating member.

Since the member 22 by its frequent and constant use is likely to become worn and broken it may have its upper end swivelly connected to a more substantial flexible member such as a chain 35. If a chain be employed, the groove 34 may be provided with a central depression 36 for the accommodation of those links that have their planes arranged at right angles to the axis of the drum, as is usual in such constructions. The upper end of the chain 35 may be connected to the drum 32 by any suitable means such as the pin 37. The drum 32 is provided with a squared opening which is adapted to engage the corresponding squared end 38 on the inner end of the operating member 39. A pin 40 secures the parts in assembled relation. The operating member 39 is provided with a cone shaped surface 41 which is adapted to engage a corresponding cone shaped bearing in one side of the housing 17. A spring 42 is mounted on the reduced portion 43 of the operating member 39 and has one end in engagement with the housing 17 and its other end in engagement with the drum 32 whereby the cone shaped member 41 is held in frictional engagement with the corresponding bearing in the housing 17. The operating member 39 is provided with a control operating member, as the lever or arm 44 for rotating the drum 32. Likewise the drum 33 which is mounted on an operating member 45 extending through the wall at the opposite side of the housing 17 at the rear of the drum 32 is adapted to be rotated by a control operating member as the lever or arm 46 in a manner similar to the drum 32.

In the operation of the device, the control operating members 44 and 46 may be rotated in one direction to wind the flexible member on the drums and thus move the levers on the control mechanisms in one direction. By moving these members in the opposite direction the levers on the control mechanisms will likewise be moved in the opposite direction by springs as has been pointed out above. The arms or levers 44 and 46 are frictionally held in any adjusted position to which they may be turned.

Attention is directed to the fact that the flexible members are so arranged that they extend from the drums along the axis of the steering post so that the rotation of the steering post together with the drums will not affect the length of the flexible members between the steering post and the arms 28 and 28$^a$ of the throttle and distributer respectively.

The housing 17 is provided with the usual button 47 for closing the circuit for operating the horn. The switch mechanism is of any suitable construction. It may consist of a suitable spring 47$^a$ having one end secured to one contact and adapted to have its other end forced by the button 47 into engagement with the other contact member 47$^b$ to complete the circuit. The conductor wires 48 and 49 extend from the switch mechanism downwardly through the interior of the post 14.

Mounted on the side of the housing 17 is a switch mechanism for dimming the lights. Any suitable mechanism may be provided for this purpose. As shown on the drawing the housing 17 is provided with a hollow boss 56 in which is secured a plug 57 preferably of insulating material. The plug 57 is provided with two binding screws 58 and 58$^a$ to which are secured suitable conductor members. The screws 58 and 58$^a$ are secured to contact points 62 and 63 located on the outer face of plug 57. A switch lever 64 is pivotally connected to the plug 57 by any suitable means such as the screw 65. The lever 64 is provided on its inner side with a recess 66 in which is mounted a spring contact conductor member 59 which is adapted to be rotated into engagement with both contact points 62 and 63 in the usual manner. The parts are so arranged that when the lever 64 is moved to one position the circuit is closed and when it is moved to the other position the circuit is open. If preferred the housing 56 may be extended slightly beyond the plug 57 and may be provided with a notch 68 for limiting the movement of the lever 64 in either direction.

It will thus be seen that a control assembly has been provided whereby the control operating devices for the spark and the gas, the dimmer switch and the switch for the horn are all mounted either in or on a single housing as a unitary structure and are adapted to be detachably mounted on the hub of the steering wheel whereby they are all in convenient reach of the operator of the car.

It will also be noted that the employment of flexible control connectors dispenses with the use of links and levers between the steering post and the control mechanisms thus eliminating the noise, looseness of parts and lost motion incident to the use of such links and levers. Moreover, these connectors may be carried about the engine to any convenient point thereof with little or no difficulty. By disconnecting them from the control mechanisms they may be removed with the housing 17, if desired. Furthermore, the control connectors, as well as the wires for the various electric switches, may all extend through the hollow steering post without increasing its size or modifying its construction in any manner. This is considered an important feature of the invention because it not only simplifies the steering column assembly but simplifies the control construction and arrangement and thereby reduces the cost of its manufacture and assembly.

It is thought from the foregoing taken in connection with the accompanying drawings that the construction and operation of my device will be apparent to those skilled in the art, and that various changes in size, shape, proportion and details of construction may be made without departing from the spirit and scope of the appended claims.

I claim:

1. A steering assembly including a hollow steering post having a wheel at its upper end, and comprising, in combination therewith, a housing supported above and within the circumference of the wheel, the housing having a cylindrical flange at its top, a horn button switch inside the flange, an electric switch mounted within the housing and having an operating device extending outside the housing, a manually-operated power-transmitting device within the housing having an operating part extending outside the housing, and flexible wire connections from the horn button switch and the electric switch and the power-transmitting device, which extend through the hollow steering post.

2. In a motor vehicle, an engine, control mechanisms therefor, a hollow steering post, a steering wheel therefor, a housing detachably connected to said wheel for rotation therewith, control operating devices mounted in said housing and having operating parts extending outside the housing, flexible members connected at their upper ends to said devices and detachably connected to said mechanisms at their lower ends, whereby said housing, said devices and said connector members may be removed as a single unit from said vehicle.

3. In an attachment for a steering wheel, a housing adapted to be detachably connected to said wheel for rotation therewith, drums mounted on rotatable shafts secured in said housing, said shafts being provided with conical portions for engaging corresponding bearing surfaces carried by said housing, springs for holding said friction and bearing surfaces in frictional engagement with each other, levers for rotating said drums, and flexible connector members adapted to be placed under tension by the operation of said drums.

4. In a motor vehicle, an engine, control mechanism therefor, a steering column, a flexible conduit between said column and said mechanism, said conduit including a compensating device for permitting the lengthening and shortening thereof, and a substantially inextensible control-operating member passing through the conduit, substantially as shown and described.

5. In a motor vehicle, an engine, a throttle valve therefor, an accelerator mechanism for opening said valve, spring means for closing the same, means including a flexible member for opening said valve, a conduit through which said member extends, said conduit including a compensating device for permitting the lengthening of said conduit when said accelerator is operated to open said throttle.

6. A compensating device for a flexible conduit, including a telescopic member having an inner and an outer section, the outer ends of said sections provided with internal shoulders having restricted openings therethrough for the reception of a flexible member, and a spring within said members and seated on said shoulders for expanding said sections.

7. In a device of the class described, control operating members a supporting member therefor, a base member provided with means whereby the same may be rigidly secured to a steering device, means for adjustably mounting said supporting member on said base member.

8. In a device of the class described a base member, said base member having an elevated portion forming an abutment, said abutment provided with arcuate slots and the central portion of said base member being provided with an opening whereby said member may be secured in position on a steering member.

9. In a motor vehicle, the combination of a steering column, a controlling device for said motor vehicle, a Bowden wire passing through the column to said controlling device for operating the latter, and a flexible conduit having one end secured adjacent the lower end of the column and enclosing the part of the wire not housed in the column.

10. In combination, a hollow steering column having a wheel at its upper end, an operating member above and within the circumference of the steering wheel, a flexible connector extending from said member through the steering column to a remote part to be operated thereby, and a non-extensible guide conduit having one end thereof secured adjacent the bottom of the steering column and enclosing that part of the connector outside of the column.

In testimony whereof I affix my signature.

HARRY M. DENYES.